Patented Dec. 29, 1931   1,838,454

UNITED STATES PATENT OFFICE

WALTER SCHOELLER, HANS JORDAN, ERWIN SCHWENK, AND ERICH BORGWARDT, OF BERLIN, GERMANY, ASSIGNORS TO SCHERING-KAHLBAUM A.-G., OF BERLIN, GERMANY

METHOD OF MANUFACTURING ALKYLISOALKYL-PHENOLS

No Drawing. Application filed December 27, 1929, Serial No. 416,999, and in Germany December 31, 1928.

Our invention refers to the production of alkyl isoalkyl phenols and more especially thymol.

As it is shown in the application for patent of the United States Serial No. 200,289 filed by Hans Jordan, June 20, 1927, by condensing meta- or para-cresol with a ketone in the presence of gaseous hydrochloric acid at a temperature somewhat above room temperature but below 100° C. there are condensation products obtained which probably correspond to the formula

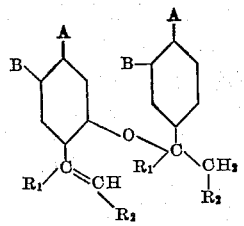

in which $R_1$ is an alkylgroup whilst $R_2$ is an alkylgroup or a hydrogen atom. One of the two symbols A and B is a methyl group while the other is a hydrogen atom.

As it is also shown in the application for patent of the United States Ser. No. 287,639 filed by Walter Schoeller, Hans Jordan and Reinhard Clerc, January 11, 1927, by condensing meta-cresol and acetone in the presence of hydrochloric acid at a temperature of approximately from 0° C. to 10° C., a condensation product of the formula $C_{17}H_{20}O_2$

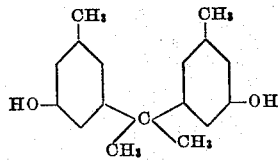

is obtained.

We have found that by heating these condensation products in a hydrogen current to the temperature of decomposition (about 300° C.) and then conveying the vapours thus obtained over a nickel catalyst which is heated in a tube to about 200° C. there are obtained alkylisoalkylphenols. This process has the advantage, that the products of decomposition are immediately hydrogenated and thus the polymerization of the alkyl isoalkylene phenols is almost entirely avoided.

Example 1

The product which can be obtained by condensing m-cresol and acetone at a temperature of about 30°–40° C. in the presence of gaseous hydrochloric acid is heated to about 300° C. Through the mass a current of hydrogen is blown and the vapours carried away by the hydrogen are conducted through a tube which is heated to about 200° C. and which is charged with a nickel-catalyst precipitated on pumice stone. After passing the tube the vapours are condensed. From the liquid thus obtained thymol can be isolated by fractional distillation.

Example 2

The product obtained by condensing p-cresol and acetone at a temperature of 30°–40° C. in the presence of gaseous hydrochloric acid is treated in the manner according to Example 1. 4-methyl-6-isopropylphenol is obtained.

Example 3

4, 4'-dimethyl-2, 2'-dihydroxydiphenyl-dimethylmethane, which can be obtained by condensing m-cresol and acetone at a temperature of about 0° C. in the presence of hydrochloric acid is heated to about 230–250° C. and then treated in the manner according to Example 1. By condensing the vapours, which have passed the tube charged with the nickelcatalyst a mixture of thymol (about 60%) and m-cresol (about 40%) is obtained, from which the thymol can be isolated by fractional distillation.

Various changes may be made in the details disclosed in the foregoing specification without departing from the invention or sacrificing the advantages thereof.

We claim:—

1. Process for the production of alkyl-isoalkyl-phenols comprising heating a condensation product of a cresol with a ketone in a hydrogen current to the temperature of decomposition and conveying the vapours over a nickel-catalyst.

2. Process for the production of thymol comprising heating a condensation product of m-cresol and acetone in a hydrogen-current to the temperature of decomposition and conveying the vapours over a nickel-catalyst.

3. The process for the production of thymol comprising heating the 4, 4'-dimethyl-2, 2' dihydroxydiphenyldimethylmethane in a hydrogen-current to 230–250° C. and conveying the vapours over a nickel-catalyst.

WALTER SCHOELLER.
HANS JORDAN.
ERWIN SCHWENK.
ERICH BORGWARDT.